(12) United States Patent
Hamilton

(10) Patent No.: US 6,772,812 B1
(45) Date of Patent: Aug. 10, 2004

(54) DUAL-FUNCTION TIRE INLET VALVE

(75) Inventor: Brian Hamilton, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/396,643

(22) Filed: Mar. 25, 2003

(51) Int. Cl.[7] .............................................. F16K 15/20
(52) U.S. Cl. ........................ 152/415; 152/429; 137/224
(58) Field of Search .................................. 152/415, 418, 152/419, 427, 428, 429; 137/223, 224, 230

(56) References Cited

U.S. PATENT DOCUMENTS

| | | | |
|---|---|---|---|
| 3,422,836 A | * | 1/1969 | Hawkes ................... 137/234.5 |
| 3,719,198 A | * | 3/1973 | Wilhelm et al. ............ 137/228 |
| 3,999,430 A | * | 12/1976 | Parduhn .................... 73/146.3 |
| 4,349,064 A | | 9/1982 | Booth |
| 4,432,405 A | | 2/1984 | Grushkin |
| 4,570,691 A | | 2/1986 | Martus |
| 4,651,792 A | | 3/1987 | Taylor |
| 5,054,511 A | * | 10/1991 | Tuan et al. ................. 137/224 |
| 5,201,968 A | | 4/1993 | Renier |
| 5,342,177 A | | 8/1994 | Cheng |
| 5,355,924 A | | 10/1994 | Olney |
| 5,472,032 A | | 12/1995 | Winston et al. |
| 5,556,489 A | | 9/1996 | Curlett et al. |
| 5,558,730 A | | 9/1996 | Olney et al. |
| 5,707,215 A | | 1/1998 | Olney et al. |
| 5,941,692 A | | 8/1999 | Olney et al. |
| 5,947,696 A | | 9/1999 | Baumgarten |
| 2002/0134428 A1 | * | 9/2002 | Gabelmann ................. 137/224 |

FOREIGN PATENT DOCUMENTS

WO     WO 90/02662    *   3/1990

* cited by examiner

Primary Examiner—Russell D. Stormer
(74) Attorney, Agent, or Firm—Sally J. Brown

(57) ABSTRACT

A dual-function tire inlet valve mountable on a tire in communication with a compressor in a tire pressure maintenance system is disclosed. The inlet valve has a conduit extending from an ambient air supply to an interior chamber of the tire. A first check valve and a second check valve are positioned within the conduit to define a pump between the first and second check valves. The pump channel is in fluid communication with a compressor in the tire pressure maintenance system. The first check valve opens automatically only when the compressor is active and the tire is rotating about its axis with at least a pre-determined velocity. The second check valve only opens when it is manually actuated. Manually actuating the first check valve opens the second check valve to permit manual adjustment of the tire pressure.

42 Claims, 4 Drawing Sheets

DUAL-FUNCTION TIRE INLET VALVE

BACKGROUND OF THE INVENTION

1. The Field of the Invention

The present invention relates to vehicle tire air pressure maintenance systems. More specifically, the invention relates to dual-function tire inlet valves.

2. Technical Background

Monitoring and maintaining proper tire air pressure for vehicles has long been an important maintenance item carried out by a vehicle owner. In the past, vehicle owners regularly checked tire pressure because low-pressure tires were easily noticed. However, as tire technology has advanced, low tire pressure has become more difficult to notice by simple observation. This, and a perception that more advanced tires experience fewer slow leaks, has lead vehicle owners to stop or drastically reduce monitoring the tire pressure for their vehicles.

Tires are still subject to leaks. Generally, the leaks are slow and may not always completely deflate the tire. The leaks may be attributable to permeability of the tire material by failed tire valves, an opening between the tire and rim, or a puncture of the tire or inner tube by a foreign object such as glass or a nail. Natural leaks may reduce the pressure by as much as one pound per square inch (psi) per month. Seasonal temperature changes also reduce tire pressure by one psi for every drop of 10 F. degrees in temperature. Changes in altitude also affect tire pressure.

Low tire pressure may cause significant problems. Studies relied upon by the National Highway Traffic Safety Administration (NHTSA) indicate that low-pressure tires reduce vehicle safety. For example, lower pressure causes more wear on the tire sidewalls, which may lead to premature failure. The NHTSA estimates that 23,464 crashes were a result of under-inflated tires.

Low tire pressure also reduces the life of the tire. Data from Goodyear and Michelin indicate that 20% under-inflation can reduce tire life by up to 50%. Low tire pressure causes the tire tread to wear non-uniformly, which may also cause premature failure of the tire. Tire costs, particularly for the trucking industry, are the second highest operating expense behind fuel.

Low tire pressure reduces the fuel economy of the vehicle. Tires with lower pressure require more energy to rotate. Goodyear indicates that tires that are 15% under-inflated result in a 2.5% increase in fuel consumption.

Finally, a federal government agency is proposing to require tire pressure monitoring systems on all new cars, trucks, and multipurpose passenger vehicles. (See "Tire pressure monitoring systems; controls and displays" NHTSA, 49 CFR Part 571) This proposal would require tire pressure systems to notify the driver if the tire pressure descends below a threshold level. Such a proposal may be very costly if conventional tire pressure maintenance and monitoring systems must be used and maintained (e.g., by replacing batteries, etc.).

In response to the problems caused by low tire pressure, efforts have been made to provide devices and systems that monitor and/or maintain the pressure in a vehicle's tires. Known pressure maintenance efforts have generally focused on mechanisms for adding small amounts of air to the tire while the tire rotates to compensate for losses due to leaks. These pressure maintenance devices include external or internal compressors that compress ambient air into an interior chamber of the tire. For the tire pressure maintenance systems to operate, air must pass into the tire via an inlet valve either before or after compression. Additionally, tires with pressure maintenance devices must have an inlet valve that allows users to manually adjust the tire pressure and allows tire professionals to service the tires.

Therefore, tires equipped with pressure maintenance devices utilize two inlet valves, one for pressure maintenance and another for traditional tire valve functions. Conventional tire inlet valves include a valve body, a valve spring, and a valve stem. The stem typically includes a valve actuator and a valve seal. The valve spring biases the valve seal against the valve body to close the valve. A user can open these conventional valves by engaging the actuator to compress the spring and move the valve seal away from the valve body.

The introduction of additional tire inlet valves for use with pressure maintenance systems is problematic during repair of damaged tires. Tire valves typically extend through the rim of the wheel. The valve must be withdrawn from the rim to service the tire and then reinserted through the rim to assemble the wheel. A second tire inlet valve presents many challenges to tire professionals that must service tires with tire pressure maintenance systems. For example, the position of the valve relative to the rim is important to ensure that the valve functions properly. A second tire valve will increase the incidence of errors in tire maintenance and the possibility of valve failure. Additionally, the costs of tire maintenance will increase with the increased complexity of the repair procedures.

Furthermore, tires often loose air pressure through valve failure. The introduction of a second tire inlet valve increases the probability of air pressure loss due to valve failure.

Accordingly, it would be an advancement in the art to provide a fail-safe tire inlet valve that can be used with existing tire pressure maintenance and monitoring systems. It would be a further advancement to provide a tire pressure maintenance and monitoring system that allows automatic and manual adjustment without requiring multiple valve structures to extend from the tire body. Additionally, it would be an advancement in the art to provide a tire inlet valve that selectively allows ambient air into a tire pressure maintenance and monitoring system only under certain conditions.

BRIEF SUMMARY OF THE INVENTION

The apparatus and method of the present invention have been developed in response to the present state of the art, and in particular, in response to the problems and needs in the art that have not yet been fully solved by currently available tire pressure maintenance and monitoring devices. Thus, the present invention provides a tire pressure maintenance system with a dual-function tire inlet valve that is simple, inexpensive, and safe.

In one embodiment, the dual-function tire inlet valve is mountable on a tire in communication with a compressor in a tire pressure maintenance system. The inlet valve has a conduit with an exterior end and an interior end. When the inlet valve is mounted on a tire, the exterior end of the conduit is in fluid communication with an ambient air supply and the interior end is in fluid communication with an interior chamber of the tire. The dual-function inlet valve also includes a first check valve positioned adjacent to one end of the conduit and a second check valve adjacent to the other end of the conduit. The first check valve is automatically opened only when the compressor is active and the tire is rotating about its axis with at least a pre-determined velocity. The second check valve opens only upon manual actuation.

A pump channel may be formed within the conduit and in fluid communication with the compressor between the first and second check valves. The first check valve may preferably be positioned adjacent to the exterior end of the conduit with the second check valve positioned adjacent to the interior end of the conduit.

The conduit may comprise a sleeve that is removably disposed in a shell surrounded by an encasement configured for mounting on a conventional tire. A portion of the sleeve may have a threaded outer surface and a corresponding portion of the shell may have a threaded inner surface such that the threaded outer surface of the sleeve mates with the threaded inner surface of the shell when the sleeve is disposed in the shell.

The sleeve, the shell and the encasement of the dual-function tire inlet valve of the present invention may be configured to associate with conventional external tire valve devices such as pumps and pressure gauges. The tire inlet valve may further comprise an air-filter cap to allow ambient air into the valve while preventing the entrance of foreign objects.

The encasement, the shell, and the sleeve may be provided with pump passages to allow fluid communication between the pump channel and the compressor. The tire inlet valve may further comprise a sleeve seal between the sleeve and the shell between the ambient air supply and the pump passages. The sleeve seal ensures that ambient air only enters the pump channel via the first check valve. A bottom seal may also be provided between the sleeve and the shell between the pump channel and the interior chamber of the tire. The bottom seal ensures that air leaving the interior chamber of the tire through the tire inlet valve exits via the second check valve.

The first check valve of the present invention may be a modified Schrader-type tire valve and the second check valve may be a standard Schrader-type tire valve. Alternatively, the first check valve may comprise a first valve body, a first valve stem extending through the first valve body, and a first valve spring associated with the first valve stem. In this embodiment, the first valve stem includes a first valve actuator and a first valve seal. The first valve spring biases the first valve stem such that the first valve seal is biased toward the first valve body in a closed position. In this embodiment, the second check valve may be similarly designed with a second valve body, a second valve stem including a second valve actuator and a second valve seal, and a second valve spring.

In this configuration, engagement of the first valve stem opens the first check valve, and engagement of the second valve stem opens the second check valve. It should be noted however, that the first valve stem may be engaged without engaging the second valve stem. Preferably, automatic inertial engagement of the first valve stem does not engage the second valve stem.

In one embodiment of the dual-function tire inlet valve of the present invention, the spring constant of the first valve spring and the mass of the first valve stem are chosen such that the first check valve opens automatically only when the compressor is active and the tire is rotating about its axis with at least a pre-determined velocity. Additionally, the spring constant of the second valve spring and the mass of the second valve stem are chosen such that the second check valve is only manually opened. The first valve spring may have a spring constant ranging from about 0.00280 lbf/in to about 0.00290 lbf/in, and the first valve stem may have a mass ranging from about 0.00015 pounds to about 0.00017 pounds. More preferably, the first valve spring may have a spring constant of about 0.002855 lbf/in, and the first valve stem may have a mass of about 0.000161 pounds.

In the dual-function tire inlet valve of the present invention, the first check valve will only open automatically if the compressor is active and if the fire is rotating about its axis with at least a pre-determined velocity. In a preferred embodiment the pre-determined velocity of the tire rotation corresponds to a velocity ranging from about 10 miles per hour to about 50 miles per hour. More preferably, the pre-determined velocity of the tire rotation corresponds to a velocity of about 40 miles per hour.

According to one alternative embodiment, an inlet valve may be configured for use with a compressor that draws ambient air and injects it into the tire through the inlet valve. The inlet valve may then have a first check valve disposed in its interior and configured to open when the compressor is active and the tire is rotating with the desired angular velocity. The first check valve allows the compressor to add air to the tire. A second check valve is disposed at an exterior end to prevent direct communication between the interior chamber of the tire and ambient air unless the inlet valve has been manually actuated to open the second check valve.

The present invention is also directed to a method for allowing ambient air into a tire pressure maintenance system. The method is performed by sealing a pump channel from an ambient air supply with a first check valve and sealing the pump channel from an interior chamber of a tire with a second check valve. The pump channel is in fluid communication with the tire pressure maintenance system, and the first check valve is automatically opened only when the tire pressure maintenance system is pulling air from the pump channel and the tire is rotating about its axis with at least a pre-determined velocity. The second check valve is only opened manually.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
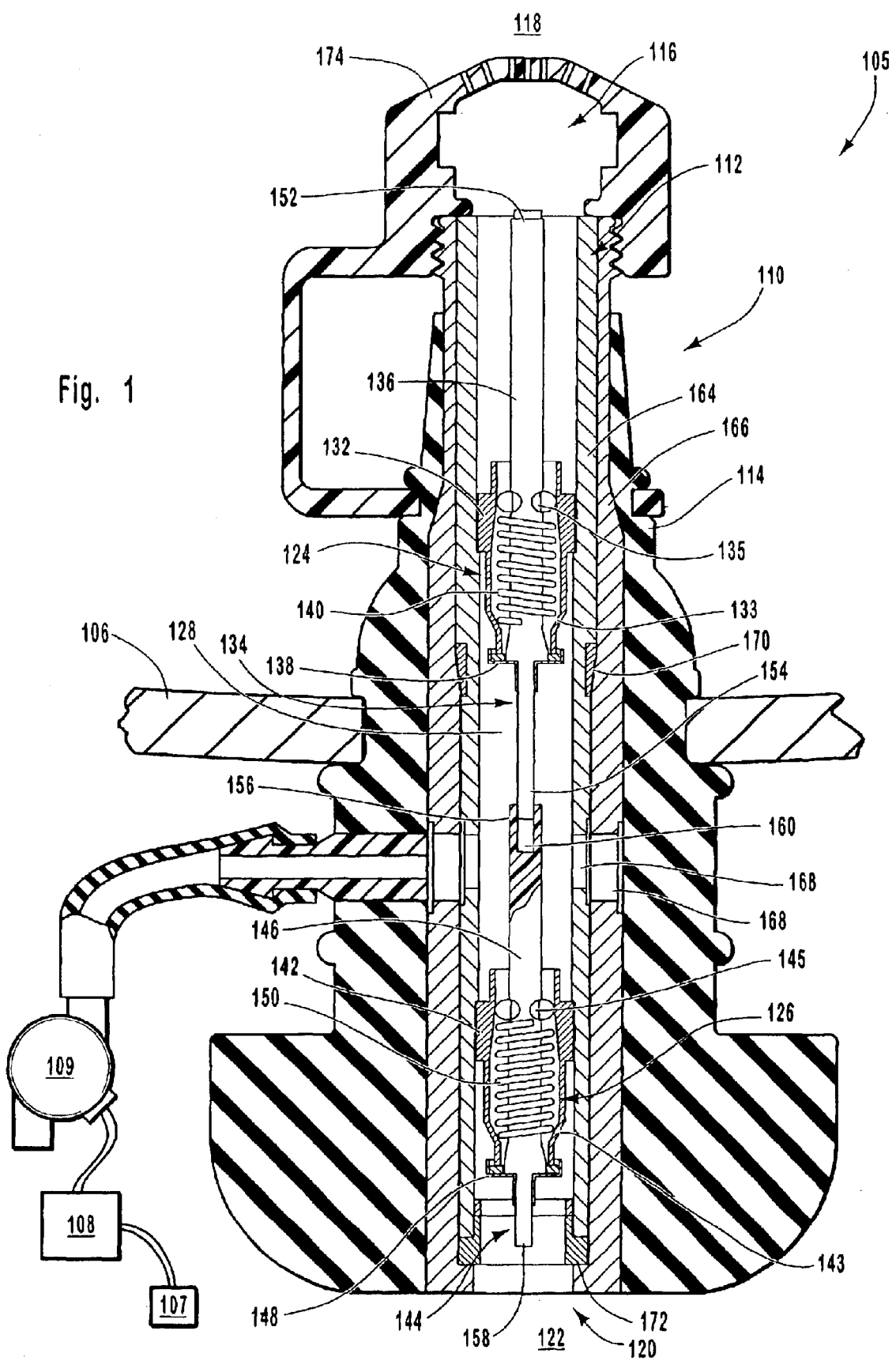
FIG. 1 is a longitudinal cross sectional view of a tire pressure maintenance system with an inlet valve in a closed position.

Turning first to FIG. 1, one embodiment of a tire pressure maintenance system 105 is shown. The tire pressure maintenance system 105 is used to detect and remedy a low internal pressure condition within a tire 106, only a portion of which is shown in FIG. 1. The tire pressure maintenance system 105 includes a pressure gauge 107 that continuously or periodically measures the pressure of air within the tire 106. The pressure gauge 107 may comprise a piezoelectric crystal, a strain element, or some other device configured to produce an output signal corresponding to a pressure change.

The pressure gauge 107 is electrically coupled to a control unit 108, which receives the signal from the pressure gauge 107 and activates a compressor 109 when the pressure gauge 107 detects pressure below an established threshold. The compressor 109 then activates to draw ambient air through a dual-function inlet valve 110 into the interior of the tire 106. As shown, the pressure gauge 107, the control unit 108, and the compressor 109 may all be disposed within the tire 106. Alternatively, the pressure gauge 107, the control unit 108, and/or the compressor 109 may be disposed at a location near the tire 106, for example, on the hub of the wheel on which the tire 106 is mounted.

The dual-function inlet valve 110 is attached to the tire 106 in a manner similar to that of conventional, single-function inlet valves. The compressor 109 is generally idle, or not actively pumping air into the tire 106, but becomes active when the pressure gauge 107 indicates that the tire pressure is low. The inlet valve 110 facilitates the flow of ambient air to the compressor 109 or, alternatively, the flow of air to or from the tire 106 for manual adjustment of the tire pressure.

FIG. 1 is a cross sectional view of one embodiment of the inlet valve 110 of the present invention. The inlet valve 110 includes a conduit 112 within an encasement 114 that is mountable in a conventional tire. When the inlet valve 110 shown in FIG. 1 is mounted in the tire 106, the conduit 112 extends from an exterior end 116 of the inlet valve 110 to an interior end 120 of the inlet valve 110. The exterior end 116 is in fluid communication with an ambient air supply 118 and the interior end 120 is in fluid communication with an interior chamber 122 of the tire 106.

Although the conduit 112 is depicted as having a generally straight, tubular shape with a uniform cross section, such a conduit need not be cylindrical or straight, and may have a non-uniform cross section. For example, in alternative embodiments, the conduit may have a non-circular cross sectional bore shape such as a polygon or ellipse. Furthermore, the conduit may be angled and/or bent along its length. Yet further, the conduit may include a structure that changes in size or shape over its length. For example, the conduit may have a conical shape. The term "conduit" includes such variations in shape, straightness, and cross sectional variation.

FIG. 1 illustrates the use of a first check valve 124 and a second check valve 126 within the conduit 112 to regulate the flow of air between the ambient air supply 118 and the interior chamber 122. The check valves 124, 126 within the conduit 112 may define two ends of a pump channel 128 that is in fluid communication with the compressor 109 of the tire pressure maintenance system 105 when the inlet valve 110 is mounted in a tire.

In accordance with the present invention, the first check valve 124 and the second check valve 126 operate to enable the inlet valve 110 to perform two distinct functions. More specifically, the inlet valve 110 seals the interior chamber 122 of the tire 106 to prevent the compressed air inside the tire 106 from escaping and allows compressed air to be injected into the interior chamber 122 of the tire 106 by a tire pressure maintenance system.

In the embodiment shown in FIG. 1, the first check valve 124 is adjacent to the exterior end 116 of the conduit 112 and the second check valve 126 is adjacent to the interior end 120 of the conduit 112. The pump channel 128 is positioned between the first and second check valves 124, 126, and is in fluid communication with the compressor 109.

The first check valve 124 is designed to automatically open only when the compressor 109 is active and the tire 106 is rotating with at least a pre-determined velocity. The automatically opened first check valve 124 allows ambient air into the compressor 109 to allow the tire pressure maintenance system 105 to add compressed air into the tire. The second check valve 126 seals the interior chamber 122 of the tire 106 and is designed to only open upon manual engagement. The second check valve 126 will not automatically open at any reasonably attainable speed, but may be intentionally opened to manually adjust the tire pressure when desired.

For this application, "manual" engagement or actuation refers to deliberate and physical contact with the inlet valve 110. The inlet valve 110 may be "manually" actuated by hand, for example, with the tip of a finger, or through the use of a tire maintenance tool to change the pressure of air within the interior chamber 122. The inlet valve 110 is disposable in three states of operation, which are depicted in FIGS. 1, 2, and 3.

More precisely, FIG. 1 displays the inlet valve 110 in a closed position wherein both the first check valve 124 and the second check valve 126 are closed. In this operational state, the second check valve 126 seals the tire 106 to prevent leakage of compressed air from within the tire. The first check valve 124 prevents air from escaping from the pump channel 128 if there is a failure in the compressor 109 or elsewhere in the tire pressure maintenance system 105, including the second check valve 126. FIG. 1 thus depicts the inlet valve 110 during normal vehicle operation, when the compressor 109 is inactive or the tire 106 has not attained the threshold rotational velocity.

Figure 2:
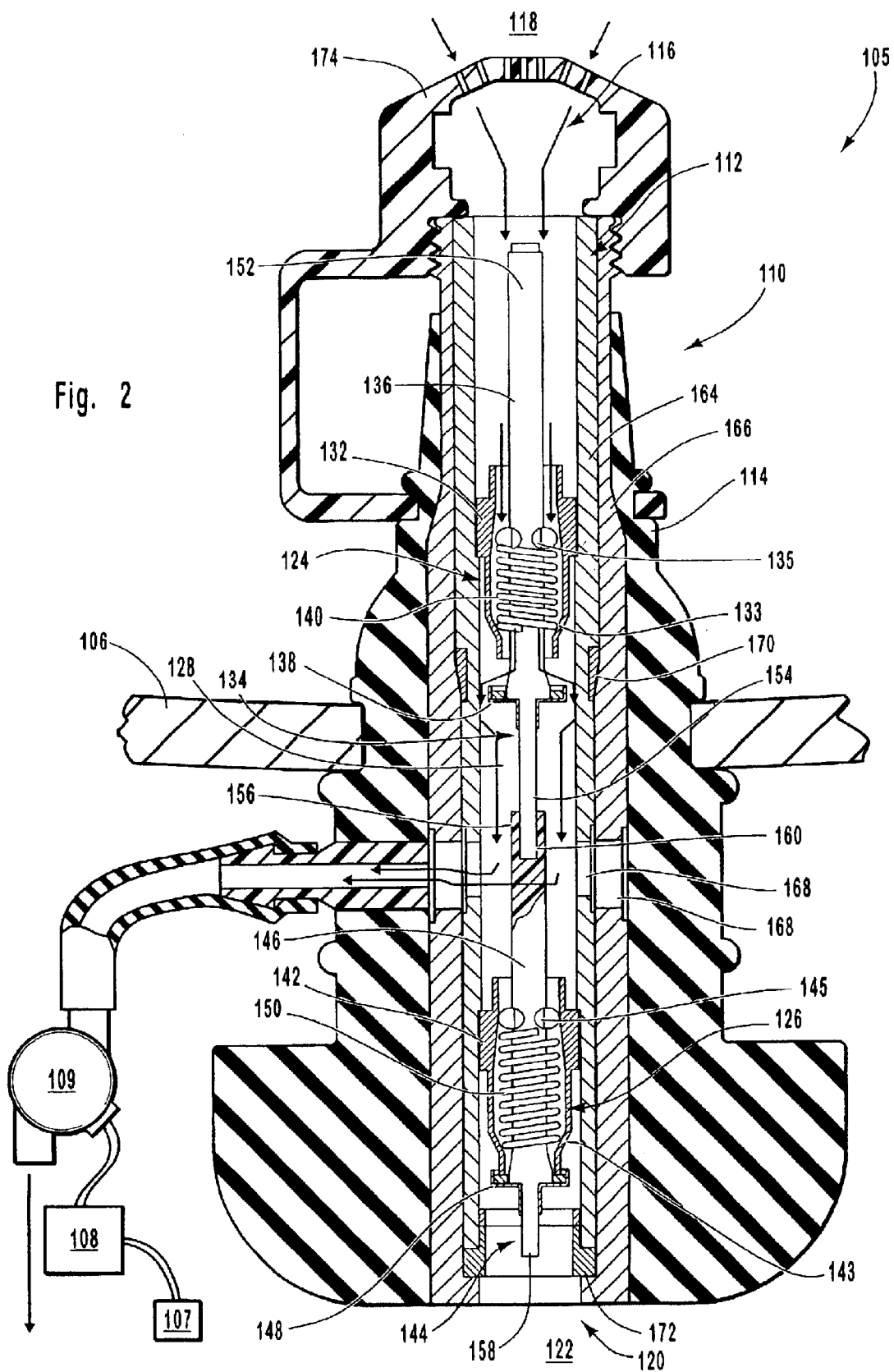
FIG. 2 is a longitudinal cross sectional view of the inlet valve of FIG. 1, with the first check valve open to permit air flow to the compressor when the valve is automatically opened.

FIG. 2 shows the inlet valve 110 when the tire 106 has reached a velocity sufficient to automatically open the first check valve 124. The second check valve 126 is still closed. In this operational state, the tire pressure maintenance system 105 is able to receive ambient air through the first check valve 124 and compress it into the interior chamber 122 of the tire. The second check valve 126 does not open until a person deliberately opens it to change the pressure of the tire.

Figure 3:
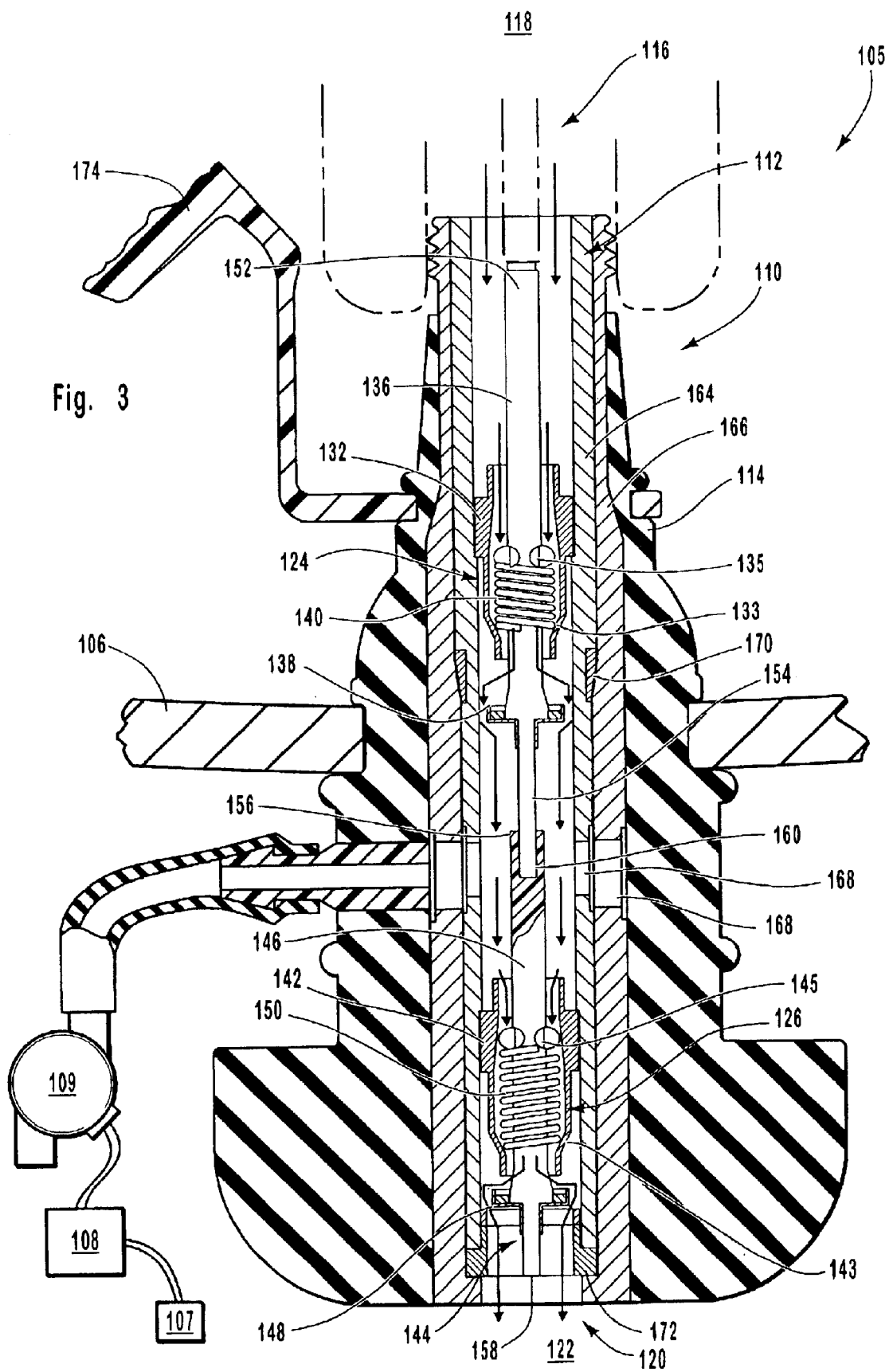
FIG. 3 is a longitudinal cross sectional view of the inlet valve of FIG. 1, with the first and second check valves open to permit air flow between the interior chamber of the tire and an ambient air supply when the valve is manually opened.

FIG. 3 depicts the inlet valve 110 when both the first check valve 124 and the second check valve 126 are manually opened. Fluid communication is then allowed between the ambient air supply 118 and the interior chamber 122 of the tire 6. In this operational state, consumers can add or remove air from the tire 106 for manual maintenance and service procedures.

The inclusion of two check valves 124, 126 provides the dual-function capability of the inlet valve 110. The second check valve 126 acts as a standard tire valve to seal the compressed air inside the tire. The first check valve 124 allows the compressor 109 and tire pressure maintenance system 105 to be used without additional inlet valves that protrude from the tire.

With reference to FIGS. 1–3, the first check valve 124 of the present invention includes a first valve body 132 with a first valve stem 134 extending therethrough. The first valve stem 134 comprises a first valve actuator 136 and a first valve seal 138. The first valve stem 134 is also associated with a first valve spring 140, which may be positioned within the first valve body 132 between a first valve neck 133 in the first valve body 132 and first pinched ears 135 on the first valve stem 134. The first valve body 132 and the first valve actuator 136 may be made of brass or of another durable material such as steel, copper, iron, nickel, or a composite material. The first valve seal 138 may be made of rubber or other similar materials that provide a seal against the first valve body. 132.

Similarly, the second check valve 126 includes a second valve body 142 with a second valve stem 144 extending therethrough. The second valve stem 144 includes a second valve actuator 146 and a second valve seal 148. The second valve stem 144 is associated with a second valve spring 150, which may be positioned within the second valve body 142 between a second valve neck 143 in the second valve body 142 and second pinched ears 145 on the second valve stem 144. The second valve body 142 and the second valve actuator 146 may be made of brass or another durable material such as steel, copper, iron, nickel, or a composite material. The second valve seal 148 may be made of rubber or other similar materials that provide a seal against the second valve body 142.

With continued reference to FIGS. 1–3 it can be seen that fluid communication is only available through the valve bodies 132, 142 and that the valve seals 138, 148 block air passage through the valve bodies 132, 142. The valve seals 138, 148 are biased into the closed position by the valve springs 140, 150 by virtue of the compression of the valve springs 140, 150 between the valve necks 133, 143 and the pinched ears 135, 145, respectively. Each check valve 124, 126 can be opened by compressing the respective valve spring 140, 150 to create a separation between the valve seal 138, 148 and the valve body 132, 142.

In the embodiment shown in FIGS. 1–3, the first valve stem 134 has an outer end 152 positioned adjacent to the exterior end 116 of the conduit 112. The first valve stem 134 passes through the first valve body 132 and past the first valve seal 138 to terminate at an inner end 154. The outer end 152 must be close enough to the exterior end 116 of the conduit 112 to allow the first valve actuator 136 to be engaged by consumers and tire professionals to open the first check valve 124 manually, for example, by using a finger or a tire maintenance tool.

The second valve stem 144 has an outer end 156 and extends through the second valve body 142, past the second valve seal 148, to terminate in an inner end 158. The outer end 156 may be in spaced relationship with the inner end 154 of the first valve stem 134. In the configuration of FIGS. 1–3, the first valve stem 134 is shown in sliding association with the second valve stem 144 and the spaced relationship is shown as space 160.

The first valve stem 134 is displaceable within the space 160 to a degree sufficient to allow the first check valve 124 to open without causing the first valve stem 134 to engage the second valve stem 144 and open the second check valve 126. The first valve stem 134 and the second valve stem 144 may alternatively be arranged in other ways to allow first check valve 124 to open without opening the second check valve 126. The first valve stem 134 is displaceable to a degree sufficient to engage the second valve stem 144 when the first valve stem 134 is manually engaged.

More specifically, it should be noted that engagement of the first valve stem 134 opens the first check valve 124 and that engagement of the second valve stem 144 opens the second check valve 126. However, it should also be observed that the first valve stem 134 is capable of engagement without engaging the second valve stem 144. Accordingly, the first check valve 124 may be automatically opened to allow ambient air into the compressor 109 without opening the second check valve 126. Additionally, it should be noted that the first valve stem 134 may engage the second valve stem 144 when the first valve stem 134 is sufficiently displaced, such as through manual engagement.

The dual-function operation of the inlet valve 110 is accomplished through the use of the two different check valves 124, 126 within the inlet valve 110. Specifically, the second check valve 126 is able to seal the interior chamber 122 of the tire 106 under normal operating conditions. Additionally, the first check valve 124 is able to allow air into the compressor when inflation is desired. Otherwise, the first check valve 124 also seals the interior chamber 122 of the tire 106 in the case of a failure within the system, such as a failure of the compressor 109 or the second check valve 126.

The second check valve 126 is similar to existing tire valves and may be a standard Schrader-type tire valve. The second check valve 126 is similar to existing valves because it will open only when it is manually actuated. Therefore, the second check valve 126 may be designed with a stiff spring to ensure that the second check valve 126 remains closed until manually engaged. The stiffness of the second valve spring 150 and the mass and dimensions of the movable parts of the second check valve 126 may be selected such that the second check valve 126 only opens when the inlet valve 110 is manually actuated. In the embodiment shown in FIGS. 1–3, the movable parts of the second check valve 126 include the second valve stem 144, which, in turn, includes the second valve actuator 146 and the second valve seal 148.

The inlet valve 110 utilizes the two check valves 124, 126 to prevent unwanted fluid communication between the interior chamber 122 and the ambient air supply 118. The first check valve 124 not only allows air to be compressed into the tire, but also provides a back-up valve to secure the air pressure inside the tire 106 in the event of a failure in the tire pressure maintenance system 105 such as a failure of the second check valve 126. For the tire pressure maintenance system 105 to function, the first check valve 124 must open to allow ambient air to flow into the compressor 109. The first check valve 124 closes in the event of a failure in the system to provide failsafe operating conditions.

Preferably, the first check valve 124 will be closed under normal operating conditions and automatically open only when the compressor needs ambient air. Because failure of the compressor 109 may allow fluid communication between the interior chamber 122 and the pump channel 128, the first valve spring 140 ensures that the first check valve 124 is closed unless the compressor 109 is active to ensure that the first check valve 124 does not permit air to flow out of the tire 106 in the absence of deliberate opening of the inlet valve 110.

The first check valve 124 of the present invention opens when the first valve seal 138 is displaced away from the first valve body 132. The displacement of the movable valve seal 138 is preferably near a direction radially outward from the axis of the tire. As the tire 106 rotates about its axis, an inertial force will act upon the movable parts of the first check valve 124. In the inlet valve 110 of FIGS. 1–3, the movable parts of the first check valve 124 include the first valve stem 134, which includes the first valve actuator 136 and the first valve seal 138. The exact rotational velocity at which the first check valve opens depends upon the spring constant of the first valve spring 140 and the mass of the movable parts of the first check valve 124. The mass of the movable parts may be somewhat constrained by the operational requirements of the first valve stem 134. Therefore, the spring constant of the first valve spring 140 may be more easily altered to allow the first check valve 124 to automatically open at reasonable vehicle speeds.

However, if the spring constant of the first valve spring 140 is low enough for the first check valve 124 to open due to inertial forces alone, the first valve spring 140 may not be strong enough to ensure proper closure of the first check valve 124 when the compressor 109 is inactive. Therefore, the first valve spring 140 may allow the first check valve 124 to open or remain open when the compressor 109 has failed, thereby allowing air to escape from the tire.

It has been discovered that a stiffer first valve spring 140 can be used to cause the first chock valve 124 to inertially open at a speed higher than that attainable in a consumer vehicle when the compressor 109 is inactive. Such a first valve spring 140 may still open automatically at a reasonable speed if the compressor 109 is running. This is because a pressure gradient across the first check valve 124 will urge the valve 124 to open if the pump channel 128 is at a pressure lower than that of the ambient air supply 118. However, when active, the compressor 109 does not produce a pressure gradient sufficient to open the first check valve 124 without the aid of an additional force, such as the outward force exerted on the first valve stem 134 by rotation of the inlet valve 110.

Therefore, the combination of the inertial force on the movable parts with the force provided by the pressure gradient is required to automatically open the first check valve 124. Consequently, the first check valve 124 will only open when the compressor 109 is active and the tire 106 is rotating with at least a predetermined velocity. For example, by balancing the several variables, a first check valve 124 can be designed that opens inertially at a rotational velocity equivalent to a vehicle speed of 150 miles per hour when the compressor 109 is inactive, but opens automatically at 40 miles per hour when the compressor 109 is active.

It should be understood that the spring constant of the first valve spring 140 and the mass of the movable parts in the first check valve 124 both determine the speed at which the first check valve 124 will inertially open without the assistance of the compressor 109. A change in the mass of the movable parts without changing the spring constant of the first valve spring 140 will affect the opening speed of the first check valve 124. Similarly, a change in the pressure gradient produced by the compressor 109 will affect the available range of spring constants for the first valve spring 140 and the available range of mass for the movable parts of the first check valve 124.

The first check valve 124 of the present invention will automatically be open at speeds that are commonly attained in the operation of a motor vehicle so that the compressor 109 is able to maintain the tire pressure during regular use. For example, the first check valve 124 will automatically open when the tire 106 is rotating with at least a vehicle velocity ranging from about 10 miles per hour to about 50 miles per hour. The vehicle velocity required to open the first check valve 124 may be about 40 miles per hour. The spring constant for the first valve spring 140 may range from about 0.0015 lbf/in to about 0.0045 lbf/in. More specifically, the spring constant may range from about 0.0028 lbf/in to about 0.0029 lbf/in. Furthermore, the spring constant may be about 0.002855 lbf/in. The mass of the movable parts of the first check valve 124 may range from about 0.00010 pounds to about 0.00025 pounds. More specifically, the mass may range from about 0.00015 pounds to about 0.00017 pounds. Yet further, the mass maybe about 0.000161 pounds.

Altering the pre-determined velocity at which the first check valve 124 will open or using the first check valve 124 with a different pressure gradient can be carried out by changing the spring constant of the first valve spring 140 and/or changing the mass of the movable parts of the first check valve 124. While opening speeds slower than 10 miles per hour are within the scope of the present invention, the required changes to the spring constant and mass are not currently preferred. If the opening speed is too low, the inertial force does not contribute significantly to the opening force and the first valve spring 140 may be too weak to ensure proper sealing when the compressor 109 is not active. Alternatively, if the opening speed is too high, the tire pressure maintenance system 105 may not have sufficiently regular opportunities to automatically add air to the tire 106 to avoid the safety risks of underinflated tires.

Prior to designing the first check valve 124, the strength of the compressor 109 is established and the desired pre-determined opening velocity is determined. Using the pressure gradient produced by the compressor 109, the inertial force required to open the first check valve 124 at the desired opening velocity can be calculated. The required inertial force can then be used to tune the mass of the movable parts and the spring constant of the first valve spring 140.

It should be observed that the first valve spring 140 must be strong enough to ensure that the first check valve 124 will be properly sealed in a number of operating conditions. First, the first check valve 124 should seal when the tire 106 is not underinflated, the compressor 109 is idle, and the tire 106 is either stationary or rotating at any velocity. Second, the first check valve 124 should seal when the tire 106 is underinflated, the compressor 109 or the second check valve 126 has failed, and the tire 106 is rotating at normal operating speeds, including speeds above the pre-determined velocity. Third, the first check valve 124 should seal when the tire 106 is underinflated, the compressor activates and opens the first check valve 124 at the pre-determined velocity, the compressor then fails, and the tire 106 continues rotating at speeds greater than the predetermined velocity.

In the embodiment of FIGS. 1–3, the conduit 112 of the dual-function tire inlet valve 10 includes a sleeve 164 removably disposed within a shell 166 surrounded by the encasement 114. The sleeve 164 and the shell 166 may be made from various materials including brass, copper, steel, nickel, and/or composite materials. Brass is a currently preferred material. The encasement 114 may be made of rubber or another material suitable for joining the inlet valve 110 to the tire.

The removable sleeve 164 and the shell 166 may be equipped with complementary threads that interlock to secure the removable sleeve 164 inside the shell 166. It may be desirable for the sleeve 164 to be removable so that a tire professional can remove the inlet valve 110 during tire maintenance and repair procedures. The sleeve 164, the shell 166, and the encasement 114 are preferably configured to associate with conventional external tire devices such as tools, external gauges, and air pumps for manual measurement and modification of tire pressure.

The pump channel 128 is in fluid communication with the compressor 9. Preferably, the sleeve 164, shell 166, and encasement 114 are provided pump passages 168 that allow air to flow from the pump channel 128 through the sleeve 164, the shell 166, and the encasement 114 to reach the compressor 109. The pump passages 168 of the sleeve 164 and shell 166 may each communicate with a groove disposed around the circumference of the sleeve 164 or shell 166. Use of such grooves is advantageous because the sleeve 164, shell 166, and encasement 114 need not be rotationally aligned for the air to flow from the pump channel 128 to the compressor 109.

It may be preferable to provide a sleeve seal 170 positioned between the sleeve 164 and the shell 166 between the exterior end 116 of the conduit and the pump passages 168. The sleeve seal 170 may be used to ensure that ambient air does not enter the pump passages 168, pump channel 128 or the interior chamber 122 of the tire 106 without passing through the first check valve 124. Similarly, a bottom seal 172 may be provided between the sleeve 164 and the shell 166 between the pump passages 168 and the interior end 120 of the conduit 112. The bottom seal 172 ensures that air can flow between the pump channel 128 or ambient air supply 118 and the interior chamber 122 of the tire 106 only by moving through the second check valve 126.

To protect the internal components of the dual-function tire valve 110 of the present invention from particulate matter, the inlet valve 110 may be provided with an air-filter cap 174. Traditional tire valve caps prevent the ambient air from passing into the pump channel 128 even if the first check valve 124 is open, but the internal components require protection from the particles and road grit that may easily clog the valve or cause a malfunction. Accordingly, an air-filter cap 174 is provided with holes small enough to block foreign objects but large enough to allow fluid communication between the first check valve 124 and the ambient air supply 118.

Figure 4:
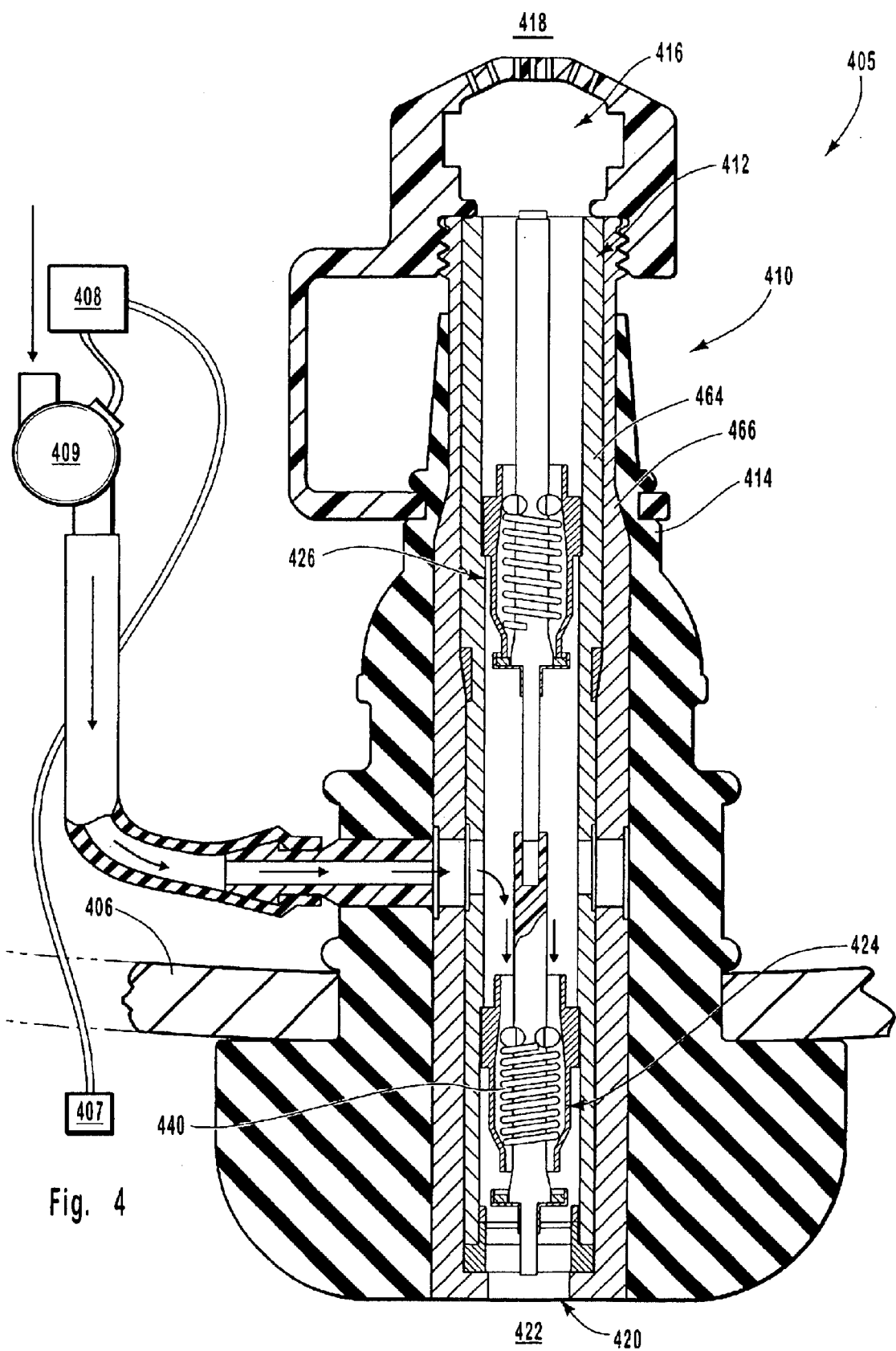
FIG. 4 is a longitudinal cross sectional view an alternative embodiment of an inlet valve according to the present invention.

Referring to FIG. 4, an alternative embodiment of a tire pressure management system 405 is depicted. The tire pressure management system 405 is designed to maintain air pressure within a tire 406. A pressure gauge 407 may be similar to the pressure gauge 107 of the previous embodiment, and may be disposed within the tire 406. A control unit 408 receives signals from the pressure gauge 407 to control a compressor 409. The control unit 408 and the compressor 409 may, for example, be disposed outside the tire 406.

The compressor 409 receives ambient air directly and pressurizes it to inject it into the tire 406 via a dual-function tire inlet valve 410. Thus, rather than permitting the compressor 409 to receive ambient air, the inlet valve 410 of FIG. 4 allows pressurized air from the compressor 409 to enter the tire 406 under the proper conditions. The inlet valve 410 will be described in greater detail as follows. FIG. 4 is similar to FIG. 1 and like components are identified with like numerals.

The inlet valve 410 has a conduit 412 somewhat similar to the conduit 112 of FIGS. 1–3. In this alternative embodiment, a first check valve 424 is adjacent to an interior end 420 of the conduit 412 while a second check valve 426 is adjacent to an exterior end 416 of the conduit 412. The compressor 409 pushes compressed air into the tire 406 through the first check valve 424 rather than pulling ambient air through the first check valve 424 to itself.

In this alternative embodiment, the second check valve 426 still operates as a traditional tire valve to allow compressed air to escape from the tire 406 only upon manual actuation of the second check valve 426. Similarly, the first check valve 424 still operates as an automatic check valve to allow the tire pressure maintenance system 405 to add air to the tire 406 only when the compressor 409 is active and the tire 406 is rotating about its axis with at least a pre-determined velocity.

The inlet valve 410 has an encasement 414, a sleeve 464, and a shell 466, each of which is similar to its counterpart of FIGS. 1–3. However, the encasement 414, sleeve 464, and shell 466 are configured to receive air from the compressor 409 from outside the wall of the tire 406. All of the other components are substantially as described in connection with the previous embodiment. As in the previous embodiment, the combination of the inertial force and the pressure gradient created by the compressor 409 will cause the first check valve 424 to open.

It should be noted, however, that in this embodiment the spring constant of the first valve spring 440, the mass of the movable parts of the first check valve 424, and the pressure difference created by the compressor 409 will be significantly different than in the previous embodiment. This is because in the previous embodiment, the first valve seal 138 and moving parts are displaced into a pump channel 128 that is not pressurized. However, in this alternative embodiment, the movable parts must be displaced into the pressurized interior chamber 422 of the tire. Therefore, it may be more difficult to create a pressure difference across the first check valve 424 that can significantly assist in opening the first check valve 424. Accordingly, the spring constant of the first valve spring 440 and the mass of the movable parts of the first check valve 424 must be adjusted to compensate for the increased pressure gradient.

The present invention is also directed toward a method for allowing ambient air into a tire pressure maintenance system. For the embodiment of FIGS. 1–3, the method is performed by sealing the pump channel 128 from the ambient air supply 118 with the first check valve 124. The pump channel 128 is in fluid communication with the compressor 109 so that the first check valve 124 provides fluid communication between the ambient air supply 118 and the compressor 109. The first check valve 124 automatically opens when the compressor 109 is pulling air from the pump channel 128 and the tire 106 is rotating with at least a pre-determined velocity.

The pump channel 128 is sealed from the interior chamber 122 of the tire 106 by the second check valve 126. The second check valve 126 can only be opened manually. The method may be adapted to suit alternative embodiments of the invention, including the embodiment of FIG. 4 and other embodiments not shown or described herein.

The present invention may be embodied in other specific from is without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A dual-function tire inlet valve mountable on a tire in communication with a compressor in a tire pressure maintenance system, the dual-function tire inlet valve comprising:
   a conduit having an exterior end and an interior end such that, when mounted on a tire, the exterior end is in fluid communication with an ambient air supply and the interior end is in fluid communication with an interior chamber of the tire;
   a first check valve positioned adjacent to one end of the conduit, wherein the first check valve is configured to open automatically only when the compressor is active and the tire is rotating with at least a pre-determined velocity; and
   a second check valve positioned adjacent to an opposite end of the conduit, wherein the second check valve is configured to open only upon manual actuation.

2. A dual-function tire inlet valve as defined in claim 1, wherein a pump channel is formed within the conduit and in communication with the compressor between the first check valve and the second check valve.

3. A dual-function tire inlet valve as defined in claim 1, wherein the first check valve is positioned adjacent to the exterior end of the conduit, and wherein the second check valve is positioned adjacent to the interior end of the conduit.

4. A dual-function tire inlet valve as defined in claim 1, wherein the conduit comprises a sleeve removably disposed within a shell surrounded by an encasement configured for mounting on a conventional tire.

5. A dual-function tire inlet valve as defined in claim 4, wherein a portion of the sleeve has a threaded outer surface, and wherein a corresponding portion of the shell has a threaded inner surface such that the threaded outer surface of the sleeve mates with the threaded inner surface of the shell.

6. A dual-function tire inlet valve as defined in claim 4, wherein the sleeve, the shell, and the encasement are configured to associate with conventional external tire valve devices.

7. A dual-function tire inlet valve as defined in claim 4, further comprising an air-filter cap configured to remove particulate matter from air entering the dual-function tire inlet valve form the ambient air supply.

8. A dual-function tire inlet valve as defined in claim 4, wherein each of the encasement, the shell, and the sleeve has a pump passage, wherein the pump passages are in communication with each other and with the compressor.

9. A dual-function tire inlet valve as defined in claim 8, further comprising a sleeve seal positioned between the sleeve and the shell and between the ambient air supply and the pump passages, wherein the sleeve seal is configured to ensure that ambient air only enters the pump channel via the check valve adjacent to the exterior end.

10. A dual-function tire inlet valve as defined in claim 9, further comprising a bottom seal positioned between the sleeve and the shell and between the pump passages and the interior chamber of the tire, wherein the bottom seal is configured to ensure that air leaving the interior chamber of the tire through the tire inlet valve exits via the check valve adjacent the interior end.

11. A dual-function tire inlet valve as defined in claim 1, wherein the first check valve is a modified Schrader-type tire valve, and wherein the second check valve is a standard Schrader-type tire valve.

12. A dual-function tire inlet valve as defined in claim 1, wherein the first check valve comprises:
   a first valve body,
   a first valve stem extending through the first valve body, and
   a first valve spring associated with the first valve stem, wherein the first valve stem comprises a first valve actuator and a first valve seal, wherein the first valve spring biases the first valve seal toward the first valve body; and
   wherein the second check valve comprises:
   a second valve body,
   a second valve stem extending through the second valve body, and
   a second valve spring associated with the second valve stem, wherein the second valve stem comprises a second valve actuator and a second valve seal, and wherein the second valve spring biases the second valve seal toward the second valve body.

13. A dual-function tire inlet valve as defined in claim 12, wherein engagement of the first valve stem opens the first check valve, wherein engagement of the second valve stem opens the second check valve, and wherein the first valve stem is capable of engagement without engaging the second valve stem.

14. A dual-function tire inlet valve as defined in claim 13, wherein first and second valve stems are configured such that automatic engagement of the first valve stem does not engage the second valve stem.

15. A dual-function tire inlet valve as defined in claim 12, wherein the first valve spring has a spring constant and the first valve stem has a mass, both of which are chosen such that the first check valve opens automatically only when the compressor is active and the tire is rotating with at least a pre-determined velocity, and wherein the second valve spring has a spring constant and the second valve stem has a mass, both of which are chosen such that the second check valve is only able to be opened manually.

16. A dual-function tire inlet valve as defined in claim 12, wherein the spring constant of the first valve spring ranges from about 0.00280 lbf/in to about 0.00290 lbf/in, and wherein the mass of the first valve stem ranges from about 0.00015 lb to about 0.00017 lb.

17. A dual-function tire inlet valve as defined in claim 12, wherein the spring constant of the first valve spring has a spring constant of about 0.002855 lbf/in, and wherein the mass of the first valve stem is about 0.000161 lb.

18. A dual-function tire inlet valve as defined in claim 1, wherein the pre-determined velocity of the tire rotation corresponds to a vehicle velocity ranging from about 10 miles per hour to about 50 miles per hour.

19. A dual-function tire inlet valve as defined in claim 1, wherein the pre-determined velocity of the tire rotation corresponds to a vehicle velocity of about 40 miles per hour.

20. A dual-function tire inlet valve mountable on a tire in communication with a compressor in a tire pressure maintenance system, the dual-function tire inlet valve comprising:

a conduit having an exterior end and an interior end such that, when mounted on a tire, the exterior end is in fluid communication with an ambient air supply and the interior end is in fluid communication with an interior chamber of the tire;

a first check valve in fluid communication with the ambient air supply, wherein the first check valve is configured to open automatically only when the compressor is active and the tire is rotating with at least a pre-determined velocity; and a second check valve in fluid communication with the interior chamber of the tire, wherein the second check valve is configured to open only upon manual actuation.

21. A dual-function tire inlet valve as defined in claim 20, wherein the first check valve is a modified Schrader-type tire valve, and wherein the second check valve is a standard Schrader-type tire valve.

22. A dual-function tire inlet valve as defined in claim 20, wherein the first check valve comprises:

a first valve body, a first valve stem extending through the first valve body, and a first valve spring associated with the first valve stem, wherein the first valve stem comprises a first valve actuator and a first valve seal, wherein the first valve spring biases the first valve seal toward the first valve body; and wherein the second check valve comprises:

a second valve body, a second valve stem extending through the second valve body, and a second valve spring associated with the second valve stem, wherein the second valve stem comprises a second valve actuator and a second valve seal, and wherein the second valve spring biases the second valve seal toward the second valve body.

23. A dual-function tire inlet valve as defined in claim 22, wherein the first valve spring has a spring constant and the first valve stem has a mass, both of which are chosen such that the first check valve opens automatically only when the compressor is active and the tire is rotating about its axis with at least a pre-determined velocity, and wherein the second valve spring has a spring constant and the second valve stem has a mass, both of which are chosen such that the second check valve is only able to be opened manually.

24. A dual-function tire inlet valve mountable on a tire in fluid communication with a compressor in a tire pressure maintenance system, the dual-function tire inlet valve comprising:

a conduit having an exterior end and an interior end such that, when mounted on a tire, the exterior end is in fluid communication with an ambient air supply and the interior end is in fluid communication with an interior chamber of the tire;

a first check valve for selectively allowing fluid communication between the ambient air supply and a pump channel, wherein the first check valve is automatically opened only when air in the pump channel is being pulled into an interior chamber of a tire and the tire is rotating about its axis with at least a pre-determined velocity; and a second check valve for selectively allowing fluid communication between the pump channel and the interior chamber of the tire, wherein the second check valve opens upon manual actuation.

25. A dual-function tire inlet valve as defined in claim 24, wherein a pump channel is formed within the conduit and in communication with the compressor between the first check valve and the second check valve.

26. A dual-function tire inlet valve as defined in claim 24, wherein the first check valve is a modified Schrader-type tire valve, and wherein the second check valve is a standard Schrader-type tire valve.

27. A dual-function tire inlet valve as defined in claim 24, wherein the first check valve comprises:

a first valve body, a first valve stem extending through the first valve body, and a first valve spring associated with the first valve stem, wherein the first valve stem comprises a first valve actuator and a first valve seal, wherein the first valve spring biases the first valve stem such that the first valve seal is biased toward the first valve body in a closed position; and wherein the second check valve comprises:

a second valve body, a second valve stem extending through the second valve body, and a second valve spring associated with the second valve stem, wherein the second valve stem comprises a second valve actuator and a second valve seal, and wherein the second valve spring biases the second valve stem such that the second valve seal is biased toward the second valve body in a closed position.

28. A dual-function tire inlet valve as defined in claim 27, wherein the first valve spring has a spring constant and the first valve stem has a mass, both of which are chosen such that the first check valve opens automatically only when air in the pump channel is being pulled from the pump channel into the interior chamber of the tire and the tire is rotating about its axis with at least a pre-determined velocity, and wherein the second valve spring has a spring constant and the second valve stem has a mass, both of which are chosen such that the second check valve is only manually opened.

29. A tire pressure maintenance system for maintaining air pressure within an interior chamber of a tire, the tire pressure maintenance system comprising:

a compressor; and a dual-function tire inlet valve comprising a conduit having an exterior end and an interior end such that, when mounted on a tire, the exterior end is in fluid communication with an ambient air supply and the interior end is in fluid communication with the interior chamber, a first check valve positioned adjacent to one end of the conduit, wherein the first check valve is configured to open automatically only when the compressor is active and the tire is rotating with at least a pre-determined velocity, and a second check valve positioned adjacent to an opposite end of the conduit, wherein the second check valve is configured to open only upon manual actuation.

30. The tire pressure maintenance system of claim 29, further comprising a pressure gauge in communication with the interior chamber to detect changes in the air pressure within the interior chamber.

31. The tire pressure maintenance system of claim 30, further comprising a control unit configured to receive an electric signal from the pressure gauge and to control operation of the compressor based on the electric signal.

32. The tire pressure maintenance system of claim 29, wherein the first check valve is positioned proximate an exterior end of the conduit and the second check valve is positioned proximate an interior end of the conduit, wherein the compressor is disposed within the interior chamber and configured to draw air from the ambient air supply through the first check valve.

33. The tire pressure maintenance system of claim 29, wherein the first check valve is positioned proximate an interior end of the conduit and the second check valve is positioned proximate an exterior end of the conduit, wherein the compressor is configured to draw ambient air and inject it into the inlet valve between the first and second check valves to increase the air pressure within the interior chamber.

34. A method for allowing ambient air into a compressor of a tire pressure maintenance system, comprising:

sealing a pump channel from an ambient air supply with a first check valve, wherein the pump channel is in fluid communication with the tire pressure maintenance system;

automatically opening the first check valve in response to creation of a pressure gradient within the pump channel by operation of the compressor and rotation of the tire with at least a pre-determined velocity; and sealing the pump channel from an interior chamber of a tire with a second check valve configured to open only in response to manual actuation.

35. A method as defined in claim 34, wherein the first check valve is a modified Schrader-type tire valve, and wherein the second check valve is a standard Schrader-type tire valve, wherein sealing the pump channel from the ambient air supply with the first check valve comprises urging a valve seal of the first check valve against a valve body of the first check valve.

36. A method as defined in claim 34, wherein the first check valve comprises:

a first valve body, a first valve stem extending through the first valve body, and a first valve spring associated with the first valve stem, wherein the first valve stem comprises a first valve actuator and a first valve seal, wherein the first valve spring biases the first valve stem such that the first valve seal is biased toward the first valve body in a closed position;

wherein the second check valve comprises:

a second valve body, a second valve stem extending through the second valve body, and a second valve spring associated with the second valve stem, wherein the second valve stem comprises a second valve actuator and a second valve seal, and wherein the second valve spring biases the second valve stem such that the second valve seal is biased toward the second valve body in a closed position;

wherein sealing the pump channel from the ambient air supply with the first check valve comprises urging the first valve seal against the first valve body, and wherein sealing the pump channel from the interior chamber of the tire with the second check valve comprises urging the second valve seal against the second valve body.

37. A method as defined in claim 36, wherein automatically opening the first check valve comprises moving the first valve stem to draw the first valve seal away from the first valve body in a manner that does not open the second check valve.

38. A method as defined in claim 36, further comprising selecting a spring constant for the first valve spring and a mass for the first valve stem such that the first check valve opens automatically only when air in the pump channel is being pulled from the pump channel into the interior chamber of the tire and the tire is rotating about its axis with at least a pre-determined velocity; and selecting a spring constant for the second valve spring and a mass for the second valve stem such that the second check valve is only manually opened.

39. A method as defined in claim 38, wherein selecting a spring constant for the first valve spring comprises selecting a spring constant ranging from about 0.00280 lbf/in to about 0.00290 lbf/in, and wherein selecting a mass for the first valve stem comprises selecting a mass ranging from about 0.00015 lb to about 0.00017 lb.

40. A method as defined in claim 38, wherein selecting a spring constant for the first valve spring comprises selecting a spring constant of about 0.002855 lbf/in, and wherein selecting a mass for the first valve stem comprises selecting a mass of about 0.000161 lb/in$^3$.

41. A method as defined in claim 38, wherein selecting the spring constant of the first valve spring and the mass of the first valve stem comprises selecting the spring constant and mass such that the pre-determined velocity of the tire rotation corresponds to a vehicle velocity in the range from about 10 miles per hour to about 50 miles per hour.

42. A method as defined in claim 38, wherein selecting the spring constant of the first valve spring and the mass of the first valve stem comprises selecting the spring constant and mass such that the pre-determined velocity of the tire rotation corresponds to a vehicle velocity of about 40 miles per hour.

* * * * *